United States Patent
Kesavan et al.

(10) Patent No.: US 11,340,961 B2
(45) Date of Patent: May 24, 2022

(54) DYNAMICALLY INTEGRATING A CLIENT APPLICATION WITH THIRD-PARTY SERVICES

(71) Applicant: AirWatch LLC, Atlanta, GA (US)

(72) Inventors: Rajneesh Kesavan, Bangalore (IN); Niranjan Paramashivaiah, Bangalore (IN); Pavan Rajkumar Rangain, Bangalore (IN); Vasu Narayanappa, Bangalore (IN); Sachin Vas, Bangalore (IN); Nirmalya Ganguly, Bangalore (IN)

(73) Assignee: AirWatch LLC, Atlanta, GA (US)

(*) Notice: Subject to any disclaimer, the term of this patent is extended or adjusted under 35 U.S.C. 154(b) by 86 days.

(21) Appl. No.: 15/467,344

(22) Filed: Mar. 23, 2017

(65) Prior Publication Data

US 2018/0276053 A1 Sep. 27, 2018

(51) Int. Cl.
*G06F 9/54* (2006.01)
*H04L 29/08* (2006.01)
*H04L 67/53* (2022.01)
*H04L 67/00* (2022.01)

(52) U.S. Cl.
CPC .............. *G06F 9/541* (2013.01); *H04L 67/20* (2013.01); *H04L 67/34* (2013.01)

(58) Field of Classification Search
CPC combination set(s) only.
See application file for complete search history.

(56) References Cited

U.S. PATENT DOCUMENTS

| | | | |
|---|---|---|---|
| 6,457,009 B1 | 9/2002 | Bollay | |
| 6,546,417 B1 | 4/2003 | Baker | |
| 7,330,824 B1 | 2/2008 | Kanojia et al. | |
| 7,392,249 B1* | 6/2008 | Harris | G06F 16/951 |
| 8,631,065 B2 | 1/2014 | Dargahi et al. | |
| 8,892,454 B2* | 11/2014 | Rabetge | G06Q 10/063 |
| | | | 705/7.36 |

(Continued)

FOREIGN PATENT DOCUMENTS

WO 2007055680 5/2007

OTHER PUBLICATIONS

Fagerberg, "Optimizing clients with API gateways", 2015, ISSN 1650-2884, pp. 1-65 (Year: 2015).*

(Continued)

*Primary Examiner* — Doon Y Chow
*Assistant Examiner* — Phuong N Hoang
(74) *Attorney, Agent, or Firm* — Thomas | Horstemeyer LLP

(57) ABSTRACT

Disclosed are various approaches for dynamically integrating a client application with multiple third-party services. An integration service receives a request to perform an action relative to a particular third-party service from a client device. The request is received through a first application programming interface (API) generic to a plurality of third-party services. The integration service communicates with the particular third-party service to perform the action using a second API specific to the particular third-party service. The integration service sends a response to the client device through the first API. The response is based at least in part on a result of the action and includes an indication of one of a plurality of predefined user interfaces.

17 Claims, 10 Drawing Sheets

(56) References Cited

U.S. PATENT DOCUMENTS

| | | | |
|---|---|---|---|
| 9,369,333 | B1 | 6/2016 | Chiu |
| 9,460,299 | B2 | 10/2016 | Weiss et al. |
| 9,483,393 | B1* | 11/2016 | Suttle .................. G06F 11/3692 |
| 9,554,197 | B2 | 1/2017 | Oh et al. |
| 9,699,729 | B2 | 7/2017 | Lebon-Schneider et al. |
| 9,774,586 | B1 | 9/2017 | Roche et al. |
| 9,800,711 | B2 | 10/2017 | Brown |
| 9,973,452 | B2 | 5/2018 | Dumans |
| 10,095,676 | B2* | 10/2018 | Wetzel .................. G06F 17/243 |
| 10,298,635 | B2* | 5/2019 | Malatesha ............. H04L 65/403 |
| 2002/0035595 | A1* | 3/2002 | Yen ......................... G06F 9/445 709/203 |
| 2002/0123983 | A1 | 9/2002 | Riley et al. |
| 2003/0018661 | A1* | 1/2003 | Darugar .................. G06F 16/88 715/239 |
| 2003/0093373 | A1 | 5/2003 | Smirnoff et al. |
| 2004/0043753 | A1 | 3/2004 | Wake et al. |
| 2006/0075043 | A1 | 4/2006 | Chen et al. |
| 2006/0136811 | A1* | 6/2006 | Burago .................. G06F 17/212 715/243 |
| 2006/0277166 | A1 | 12/2006 | Vogler-Ivashchanka et al. |
| 2007/0094042 | A1 | 4/2007 | Ramer et al. |
| 2007/0157113 | A1 | 7/2007 | Bishop et al. |
| 2007/0291911 | A1* | 12/2007 | Visser ...................... H04L 12/66 379/88.13 |
| 2008/0005247 | A9 | 1/2008 | Khoo |
| 2009/0228807 | A1 | 9/2009 | Lemay |
| 2009/0271283 | A1 | 10/2009 | Fosnacht et al. |
| 2010/0100778 | A1 | 4/2010 | Sullivan |
| 2010/0305855 | A1 | 12/2010 | Dutton et al. |
| 2011/0105154 | A1 | 5/2011 | Kim |
| 2011/0179362 | A1 | 7/2011 | Craddock et al. |
| 2011/0282969 | A1* | 11/2011 | Iyer ......................... G06F 9/541 709/217 |
| 2013/0074038 | A1 | 3/2013 | Fox et al. |
| 2013/0086597 | A1* | 4/2013 | Cornwall ................ G06F 9/451 719/328 |
| 2013/0111500 | A1* | 5/2013 | Dixon ..................... G06F 9/546 719/314 |
| 2013/0159432 | A1 | 6/2013 | Deering |
| 2013/0173727 | A1 | 7/2013 | Libin et al. |
| 2013/0219365 | A1 | 8/2013 | Rago et al. |
| 2014/0040756 | A1 | 2/2014 | Bukurak et al. |
| 2014/0052797 | A1 | 2/2014 | Lessard et al. |
| 2014/0095894 | A1 | 4/2014 | Barton et al. |
| 2014/0100871 | A1 | 4/2014 | Toleti et al. |
| 2014/0129942 | A1* | 5/2014 | Rathod ............ H04N 21/44222 715/720 |
| 2014/0215312 | A1* | 7/2014 | Hicks ...................... G06F 16/95 715/235 |
| 2014/0236649 | A1 | 8/2014 | Hamid et al. |
| 2014/0245176 | A1 | 8/2014 | Murali et al. |
| 2014/0245178 | A1 | 8/2014 | Smith |
| 2014/0278935 | A1* | 9/2014 | Gara .................. G06Q 30/0251 705/14.45 |
| 2014/0282254 | A1 | 9/2014 | Feiereisen et al. |
| 2014/0337441 | A1 | 11/2014 | Schnitman et al. |
| 2014/0344273 | A1 | 11/2014 | Haines |
| 2015/0007048 | A1 | 1/2015 | Dumans |
| 2015/0143258 | A1 | 5/2015 | Carolan et al. |
| 2015/0149552 | A1* | 5/2015 | Oh ......................... G06Q 10/10 709/204 |
| 2015/0271118 | A1 | 9/2015 | Nudel et al. |
| 2015/0319123 | A1 | 11/2015 | Dumans |
| 2015/0350134 | A1 | 12/2015 | Yang et al. |
| 2016/0055079 | A1 | 2/2016 | Hanna |
| 2016/0078493 | A1* | 3/2016 | Liberty ............... G06Q 30/0269 705/14.66 |
| 2016/0320926 | A1 | 11/2016 | Ganin et al. |
| 2016/0328097 | A1 | 11/2016 | Ganin et al. |
| 2016/0379279 | A1* | 12/2016 | Ashery ............... G06Q 30/0276 705/14.72 |
| 2017/0091159 | A1* | 3/2017 | Su ......................... G06F 17/2247 |
| 2017/0346811 | A1 | 11/2017 | Newell |
| 2018/0165070 | A1* | 6/2018 | Khambay ................. G06F 8/35 |

OTHER PUBLICATIONS

Josuttis, "SOA in Practice", O'Reilly, pp. 1-303. (Year: 2007).*
Office Action dated May 21, 2018 for U.S. Appl. No. 15/343,236.
Office Action dated Dec. 4, 2018 for U.S. Appl. No. 15/343,236.
Office Action dated Jan. 24, 2019 for U.S. Appl. No. 15/343,225.
Office Action mailed for U.S. Appl. No. 15/343,236.
Final OA mailed for U.S. Appl. No. 15/343,225.
Boxer, Boxer for Android—A Better Inbox, Sep. 2, 2014, Youtube. com, URL: https://www.youtube.com/watchv=ZO-rkDeeeCc (Year: 2014).
Anatara Bhattacharya, How to integrate Facebook with Salesforce, Oct. 9, 2014, URL:https://web.archive.org/web/20141009001443/hllp://appshark.com:80/blog/how-to-integrate -facebook-with-salesforce/.
OurSalesForceAdmin, Setting up Outlook Salesforce Sync, Jun. 15, 2014 Youtube com, URL: https://www.youtube.com/watchv=xMptKztxYg4.
Salesforce App for Outlook, Aug. 30, 2015, URL:hllps://web.archive.org/web/20150830163042/https://releasenotes.:docs.salesforce.com/enus/winter16/releasenotes/rn sales_ email_ connect_ salesforceapp for_ outlook.htm (Year: 2015).
Sales force, Using the Sales force Side Panel to Work with Records in Microsoft Outlook, May 17, 2013, Youtube.com, URL:https://www.youtube.com/watchv=ffzF-WYmS0g (Year: 2013).

* cited by examiner

DYNAMICALLY INTEGRATING A CLIENT APPLICATION WITH THIRD-PARTY SERVICES

CROSS-REFERENCE TO RELATED APPLICATION

This application is related to U.S. patent application Ser. No. 15/343,225, filed on Nov. 4, 2016, entitled ARCHITECTURE FOR PERFORMING ACTIONS IN A THIRD-PARTY SERVICE BY AN EMAIL CLIENT, which is hereby incorporated herein by reference in its entirety. This application is also related to U.S. patent application Ser. No. 15/343,236, filed on Nov. 4, 2016, entitled ARCHITECTURE FOR PERFORMING ACTIONS IN A THIRD-PARTY SERVICE BY AN EMAIL CLIENT, which is hereby incorporated herein by reference in its entirety.

BACKGROUND

Users in an enterprise environment often engage with one or more network-accessible services hosted by third parties. For instance, a user can engage with a customer relationship management service, a task tracking service, an accounting service, a source code management service, and so forth. As part of using these services, the users may wish to communicate, to the service, information that is available through another client application. This information can include files, uniform resource locators (URLs), email messages, and contact information (e.g., names, email addresses, telephone numbers, etc.). As an example, a user may want to transfer contact information from an email client application to a customer relationship management service. As another example, a user may want to transfer a file from a document management client application to a task tracking service. Without a form of integration between the client application and the third-party service, users are left to manually copy the information from the client application and then manually enter it through a user interface of the third-party service (e.g., another client application or a browser).

One approach to accomplishing integration is to modify the code of the client application to call an application programming interface (API) of the third-party service. The client application can provide an action that, when selected, transfers the information to the third-party service. However, the API of the third-party service can change from time to time, thereby breaking the integration. Modifying the binary code of the client application to work with the updated API can be expensive, and the updated client application would need to be pushed for installation to all of the client devices in the enterprise environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
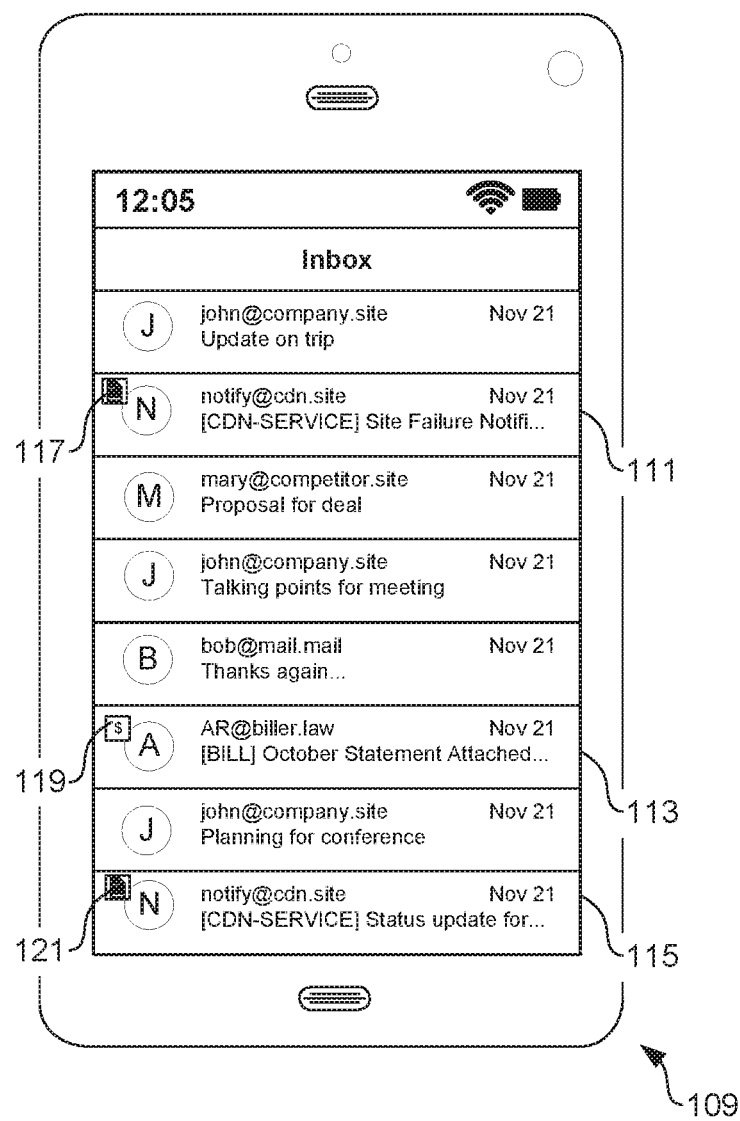
FIGS. 1A-1E depict example user interfaces generated by an email client according to various examples of the disclosure.

The present disclosure relates to an architecture that dynamically integrates a client application with one or more network-accessible third-party services. The binary code of a client application can be modified to call an application programming interface (API) of a third-party service, but this approach can be costly and inefficient over time as changes to the API occur. A change to the API can render the integration inoperable, thereby necessitating changes to the binary code to restore the functionality. Moreover, the updated client application would need to be pushed out to all client devices, and problems can occur in rolling out the updates. Also, if a new integration with a third-party service is to be rolled out, updated versions of the client application would need to be distributed.

For these reasons, a dynamic form of integration is preferable. As will be described, various examples of the present disclosure introduce an intermediate service that facilitates communication between a client application and a third-party service. The client application is designed to generically support actions through third-party services. Through this generic support, user interfaces of the client application can be dynamically configured through hypertext markup language (HTML), extensible markup language (XML), and/or JAVASCRIPT to allow for performing actions relative to information.

When the action is performed, the client application communicates the information to the intermediate service. The intermediate service then calls the API of the third-party service with the provided information. The intermediate service receives a response from the third-party service through the API, which is then formatted for presentation by the client application and returned to the client application. In this way, any code changes to support changes to the API of the third-party service are localized to the intermediate service and do not require changes to the client application.

Examples of integrations of client applications with third-party services are next discussed. For example, an email message from a cloud-based software bug repository can include information about a submitted bug and a link to a page in the cloud-based bug repository, where the user can perform an action with respect to the reported bug. For example, once the user follows the link, the bug repository might authenticate a user with single sign-on or request the user to authenticate his or her credentials, and then present additional links or user interface elements through which the user can take an action with respect to the bug. In this scenario, the user might be able to assign the bug to a developer on his or her team, escalate the bug, close a trouble ticket associated with the bug, or perform any other action that is provided for by the bug repository.

As another example, a billing service can generate emails for bills that must be approved, denied, delegated, etc. An email notification about a particular bill can be sent to a user, and the email might include some information about the particular bill as well as a link to a website associated with the billing service or to an application installed on a user's device. The web page or application of the billing service can allow a user to approve the bill for payment, deny payment, or perform any other action that is provided by the billing service.

FIG. 1A illustrates an example of a mailbox view generated by an email client 109 according to one example of the disclosure. In the example of FIG. 1A, the email client 109 can be executed by a client device that is enrolled as a managed device with a management service. The operating system of the client device can provide APIs that allow the client device to be enrolled as a managed device and provide the ability for a remotely executed management service, in coordination with a locally executed management component, to manage and oversee operation of the client device. Accordingly, the email client 109 can be installed as a managed application that is managed by the management service.

In the example of FIG. 1A, the email client 109 can identify emails that are generated by or associated with a third-party service. In the example of FIG. 1A, emails 111, 113, and 115 are identified by the email client 109 as being associated with respective third-party services. Accordingly, the email client 109 can render icons 117, 119, and 121 that indicate to a user that the emails 111, 113, and 115 are associated with third-party services and that one or more actions can be taken by the email client 109 in the respective third-party services on behalf of the user.

The email client 109 can identify the emails 111, 113, and 115 based upon one or more configuration profiles that are installed on the client device and define how emails sent from a particular third-party service can be identified. In one example, the configuration profiles can specify that an email from a particular third-party service can be identified based upon a particular sender or recipient address. In other words, the configuration profiles can specify that an email sent from or to a particular sender address is linked with a particular third-party service. In another example, the configuration profiles can specify that an email subject or body containing a particular string or string pattern is associated with the third-party service. The configuration profiles can specify a particular regular expression that the email client 109 can interpret to identify whether the string pattern or particular string exists in the text associated with the email.

The configuration profiles can also contain an icon or a reference to an icon that the email client 109 can render in the user interface to indicate to the user which emails are associated with a particular service. Additionally, the configuration profiles can specify one or more actions that the email client 109 can take on behalf of the user in the third-party service. In one example, selections of these one or more actions can be displayed in response to a gesture that the email client 109 can detect. For example, if the user performs a swipe or tap gesture on one of the emails 111, 113, or 115, the email client 109 can display one or more actions that the email client 109 can take on behalf of the user in the third-party service. The actions can be specified by the configuration profiles.

In one example, a user of the email client 109 can configure an email service profile to specify which gestures are associated with which actions. In another example, an administrator of a management service can configure a profile to specify which gestures are associated with which actions. In any case, the profile can specify one or more gestures that, when performed on the client device, cause one or more actions to be available for selection or be taken at the third-party service.

Figure 1B:
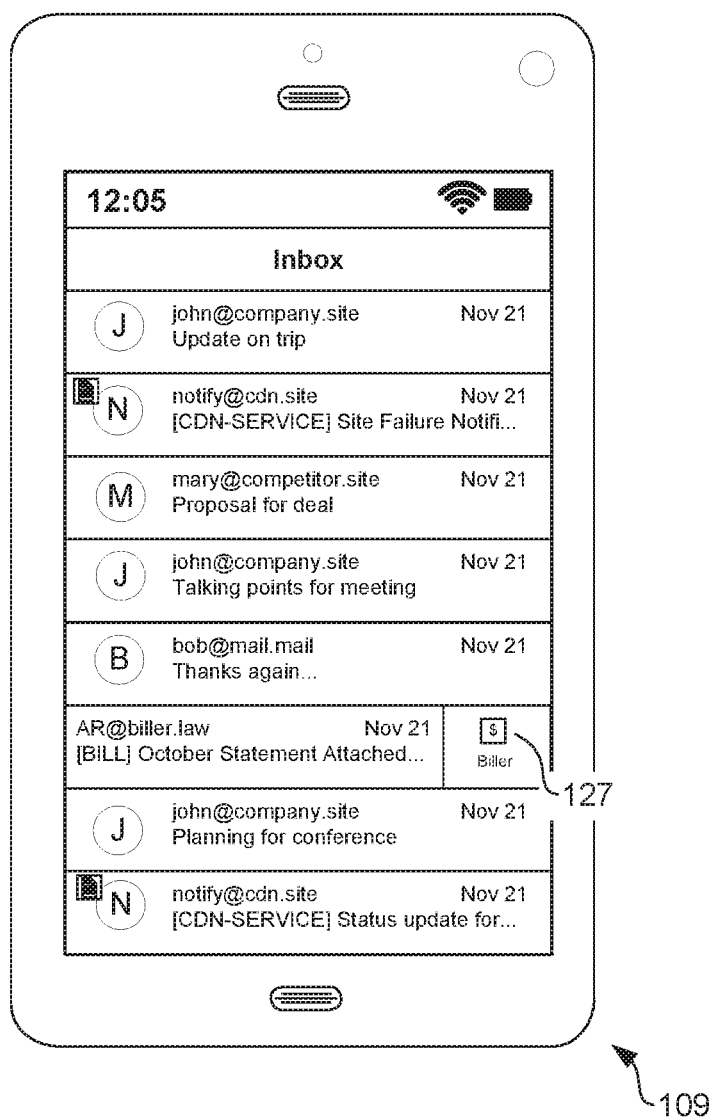

Accordingly, reference is now made to FIG. 1B, which illustrates an example of how the email client 109 can update a mailbox view in response to detecting a particular gesture on an email message 115 associated with a third-party service. In the example of FIG. 1B, the email client 109 can display an additional icon 127 when the email message 115 is swiped to a side. The email client 109 can recognize in a contextually intelligent way that the icon 127 should be displayed in response to the swipe because this particular email message 115 is determined to be associated with the "biller" action. The email client 109 can examine content of the email message 115 to determine the context or examine historical actions. This icon 127 can indicate to the user that the email client 109 can perform the one more actions on behalf of the user within the third-party service. The email client 109 can perform the action by communicating with an integration service.

Figure 1C:
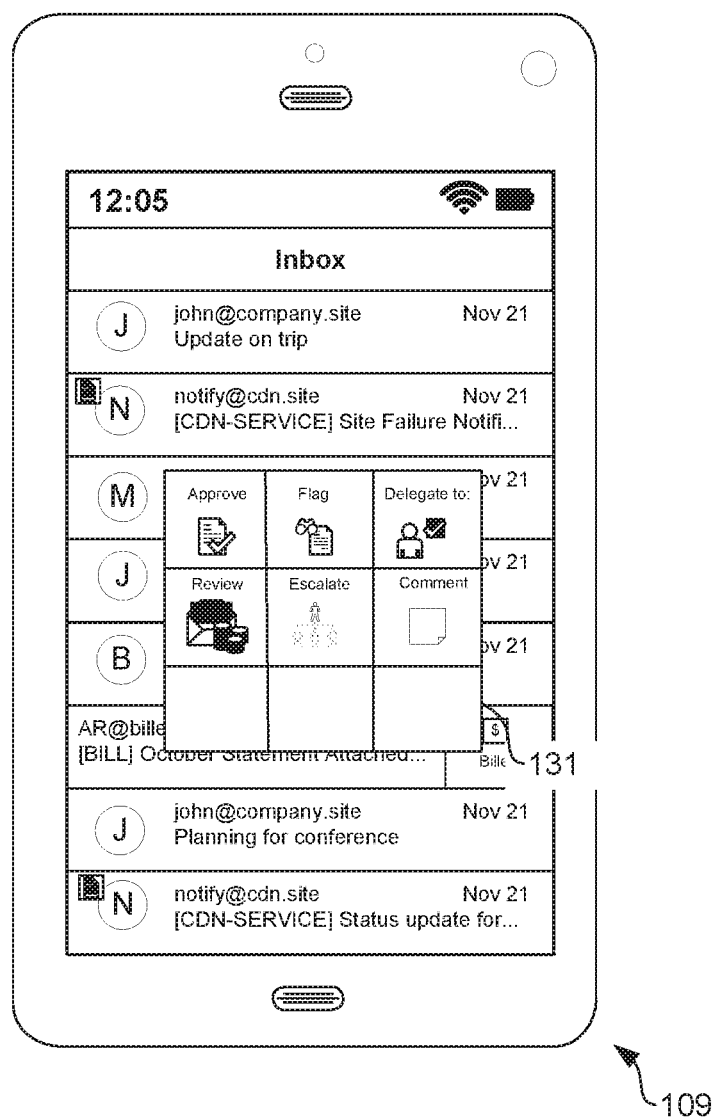

Continuing the example of FIG. 1B, reference is now made to FIG. 1C, which illustrates an example of a user interface element or window 129 that the email client 109 can generate in response to detecting a particular gesture on the email message 115. In one example, the email service profile can specify a layout for the window 129 by identifying one or more native user interface controls provided by the operating system of the client device, which can populate the window 129. The layout can include a user interface element, such as a button, that, when activated by the user, can cause an action to be performed within the third-party service by the email client 109. The configuration profiles can also specify an icon, text, and executable code associated with each of the actions in the layout of the window 129. The executable code can execute a command within the third-party service by communicating with an integration service.

In one scenario, the email client 109 can provide text of the email, such as the subject and/or the body, to the executable code specified by the configuration profiles from which the executable code can identify a particular data item. For example, the executable code specified by the configuration profiles can extract an identifier for a particular bug in a bug management system or a biller within a billing service from the text of the email. In this way, the executable code associated with configuration profiles can submit the identifier for a selected action to the integration service.

In another scenario, the configuration profiles can specify a URL that the email client 109 can render within a web view window facilitated by a web view API of the operating system of the client device. In this scenario, the email client 109 can provide a portion of the text of the email, such as the subject and/or body, as a parameter to a URL specified by email service profile. The third-party service can render a layout of the window 129 within the web view component, which can include links to the various actions that are displayed therein.

Figure 1D:
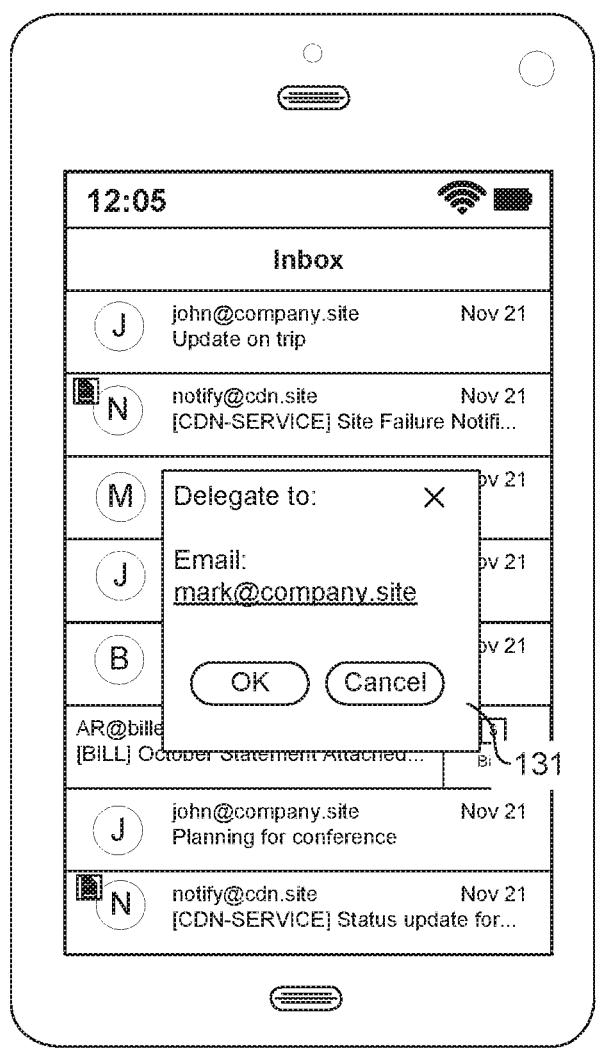

Continuing the example of FIG. 1C, reference is now made to FIG. 1D. In the example of FIG. 1D, a user has selected one of the actions within the window 131 of FIG. 1C. In this example, the selected action requires additional data entry or input from the user. Accordingly, the configuration profiles can specify additional content that can be displayed by the email client 109 or an additional URL that can be requested and rendered by a web view component of the operating system of the client device. This additional content can correspond to prepopulated data in a form, where the data is prepopulated in a contextually intelligent way. This prepopulated data can be extracted from the email message 115 or based on historical actions. For example, "mark@company.site" can be the last email address to which a similar message was delegated.

Figure 1E:
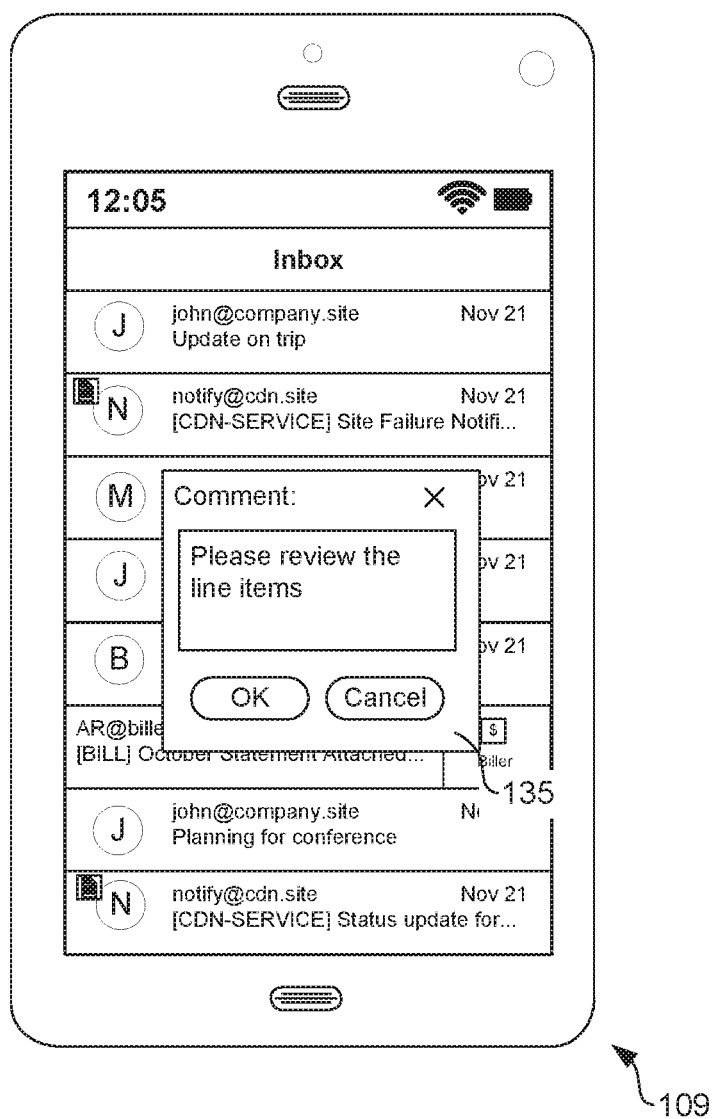

FIG. 1E presents an alternative scenario. In the example of FIG. 1E, the user has selected a different action in the window 131 of FIG. 1C. In response, the email client 109 can render the content in the depicted window 135, whether the content is rendered in response to a URL in a web view component or native user interface controls specified by the configuration profiles.

Figure 2:
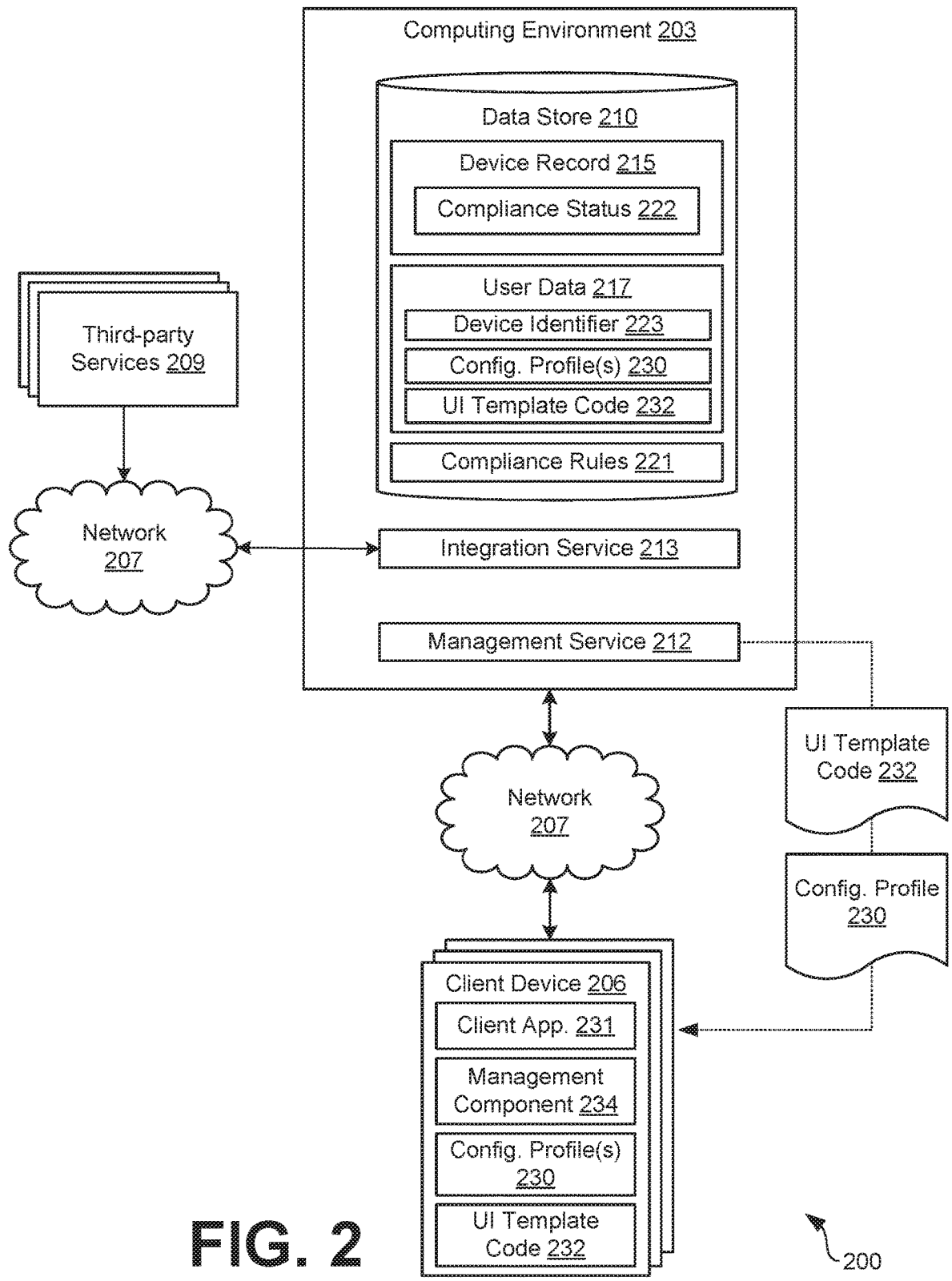
FIG. 2 depicts a networked environment according to various examples of the disclosure.

Referring next to FIG. 2, shown is an example of a networked environment 200 according to examples of the disclosure. In the depicted networked environment 200, a computing environment 203 is in communication with at least one client device 206 and a plurality of third-party services 209 over a network 207. Non-limiting examples of third-party services 209 can include FACEBOOK, SALESFORCE, JIRA, and CONCUR, among others.

The network 207 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 203 can be a computing environment that is operated by an enterprise, such as a business or other organization. The computing environment 203 includes a computing device, such as a server computer, that provides computing capabilities. Alternatively, the computing environment 203 can employ multiple computing devices that are arranged in one or more server banks or computer banks. In one example, the computing devices can be located in a single installation. In another example, the computing devices for the computing environment 203 can be distributed among multiple different geographical locations. In one case, the computing environment 203 includes multiple computing devices that together can form a hosted computing resource or a grid computing resource. Additionally, the computing environment 203 can operate as an elastic computing resource where the allotted capacity of computing-related resources, such as processing resources, network resources, and storage resources, can vary over time. In other examples, the computing environment 203 can include or be operated as one or more virtualized computer instances that can be executed to perform the functionality that is described herein.

Various applications or other functionality can be executed in the computing environment 203. Also, various data can be stored in a data store 210 that can be accessible to the computing environment 203. The data store 210 can be representative of a plurality of data stores 210. The data stored in the data store 210 can be associated with the operation of the various applications or functional entities described below.

The components executed on the computing environment 203 can include a management service 212, an integration service 213, and other applications, services, processes, systems, engines, or functionality not discussed in detail herein. The management service 212 can be executed in the computing environment 203 to monitor and oversee the operation of one or more client devices 206 by administrators. In some examples, the management service 212 can represent one or more processes or applications executed by an enterprise mobility management (EMM) provider that facilitates administration of client devices 206 of an enterprise that are enrolled with the EMM provider. To this end, the operating system and application ecosystem associated with the client device 206 can provide various APIs and services that allow client devices 206 to be enrolled as managed devices with the management service 212. The management service 212 can initiate installation of applications as managed applications. The management service 212 can also initiate installation of configuration profiles that can be accessed by certain applications installed on a client device 206.

The management service 212 can include a management console that can allow administrators to manage client devices 206 that are enrolled with the management service 212. User interfaces can allow an administrator to define policies for a user account or devices associated with an enterprise environment. The user interfaces can also include, for example, presentations of statistics or other information regarding the client devices 206 that can be managed by the management service 212.

The management service 212 can generate and install configuration profiles 230 on an enrolled client device 206. The configuration profiles 230 can be installed using management APIs provided by an operating system of the client device 206. The management service 212 can communicate with a management component 234 installed on the client device 206 that locally enforces compliance rules 221 associated with the client device 206 and that can manage configuration profiles 230 and other data that is installed on the client device 206 using management APIs.

The integration service 213 can be executed to dynamically integrate client applications 231 of client devices 206 with third-party services 209. Specifically, when a user initiates an action using a client application 231, the client application 231 can then send a request to perform the action to the integration service 213 using an API that is generic to the third-party services 209. The integration service 213 then communicates with a particular third-party service 209 to perform the requested action using an API specific to the particular third-party service 209. A result is returned to the integration service 213, and then the integration service 213 can instruct the client application 231 using the generic API to render one of several predefined user interfaces on a display. Through the integration service 213, native code that implements the APIs specific to the third-party services 209 can be localized to the computing environment 203, thereby avoiding binary updates to the client applications 231 on the client devices 206.

The data stored in the data store 210 can include device records 215, user data 217, compliance rules 221, and potentially other data. Device records 215 can include correspond to client devices 206 that are enrolled as managed devices with the management service 212. A device record 215 can include various security settings selected for enforcement on a client device 206 that is enrolled with the management service 212. Accordingly, a device record 215 can include a device identifier associated with a device, such as the client device 206, one or more device certificates, a compliance status 222, and other data. In some examples, a device record 215 can also identify a user associated with a particular client device 206. The compliance status 222 can indicate whether a particular client device 206 is in compliance with one or more compliance rules 221.

A device record 215 can also store other device specific information, such as a device type, operating system type or version, applications that are required or optional for the device, or an enrollment status of the device. In this scenario, the device record 215 can also indicate whether a managed device is a computing device or a peripheral device, such as a printer, scanner, or other device that can be deployed in an environment and associated with a record in a directory service.

A compliance status 222 of a client device 206 represents whether the device is in compliance with one or more compliance rules 221. Various compliance rules 221 can be enforced by the management service 212 by the client device 206. The compliance status 222 can be determined by a management component 234 on the client device 206 that analyzes the status of the client device 206 and reports compliance to the management service 212. In other examples, the compliance status 222 can be determined by the management service 212 based upon information about the status of the client device 206 that is reported by the management component 234.

User data 217 contains information about users who are associated with client devices 206 that are enrolled with the management service 212. User data 217 can include profile information about a user, authentication information about a user, applications that are installed on client devices 206 associated with the user, and other user information. For example, user data 217 can include information about client devices 206 that are associated with a user account of the user, enterprise resources to which a particular user has access, such as email, calendar data, documents, media, applications, network sites, or other resources. The user data 217 can also identify one or more user groups of which a particular user is a member, which can in turn define the access rights of the user to one or more enterprise resources as well as identify which applications should be deployed to a client device 206 associated with the user. To this end, the user data 217 can further identify one or more device identifiers 223 that can uniquely identify client devices 206 that are associated with a user account of the user.

The user data 217 can also include one or more configuration profiles 230 that are associated with a user or a user's installation of a client application 231 on a client device 206. As noted above, the configuration profiles 230 can define the manner in which an item of information associated with a particular third-party service 209 can be detected. The configuration profile 230 can also include an authentication credential, such as an authentication token, that authenticates a particular user with the third-party service 209.

The configuration profile 230 can also specify various user interface templates implemented by user interface template code 232 to facilitate integration. For example, the user interface template code 232 can include or specify an icon that the client application 231 can display in association with an email message linked with the third-party service 209.

The user interface template code 232 can define the layout of a user interface or windows that can be displayed in response to detecting a particular gesture made over content within a view in the client application 231. The user interface template code 232 can also include executable code that specifies how the client application 231 can take a particular action on a data item with the third-party service 209 by way of the integration service 213. For example, the user interface template code 232 can implement user interfaces through hypertext markup language (HTML) that is customized by cascading style sheets (CSS). Each user interface defined by the user interface template code 232 can be uniquely identified by an identifier attribute in the configuration profile 230. JAVASCRIPT can be used as a bridge between the HTML user interface and the native code of the client application 231. The JAVASCRIPT can include client-side business logic such as processing an action response and populating data in a user interface. Also, the user interface template code 232 can define a URL or a link to content generated by the third-party service 209 that is displayed within a web view component within the client application 231.

The client device 206 can represent multiple client devices 206 coupled to the network 207. The client device 206 includes, for example, a processor-based computer system. According to various examples, a client device 206 can be in the form of a desktop computer, a laptop computer, a personal digital assistant, a mobile phone, a smartphone, or a tablet computer system. The client device 206 can represent a device that is owned or issued by the enterprise to a user, or a device that is owned by the user. The client device 206, when provisioned, can be enrolled with the management service 212 as a managed device of the enterprise.

The client device 206 can execute a management component 234 that can communicate with the management service 212 to facilitate management of the client device 206. The management component 234 can communicate with the management service 212 to enforce management policies and compliance rules on the client device 206. For example, the management component 234 can enforce data security requirements, install, remove or update security certificates, or write, modify or delete certain data from the client device 206. The management component 234 can also monitor network activity of the client device 206, the location of the client device 206, enforce password or personal identification number (PIN) requirements, or any other security or acceptable-use policies that are defined in the management service 212 and sent to the management component 234 over the network 207.

To carry out local management of a client device 206, the management component 234 can be installed and executed with elevated or administrative privileges on the client device 206. In some scenarios, the operating system can allow a particular application or package to be identified as a device owner or a device administrator.

The client application 231 can also be installed on the client device 206. As a managed device that is enrolled with the management service 212, the client application 231 can be installed by the management service 212. The client application 231 can contain native code that implements the generic API supported by the integration service 213. In particular, the native code can act as a communication channel between the user interface template code 232 and the integration service 213, respond to requests for application-related information (e.g., email identifier, document name), and process callback requests and perform actions in response to callback requests. The client application 231 in one example communicates with the integration service 213 using representational state transfer (REST) over hypertext transfer protocol (HTTP).

In one scenario, the management service 212 can send a request to the management component 234 to retrieve and install the client application 231 on the client device 206. In this sense, installation of the application is initiated by the management service 212. The client application 231 could also be retrieved from a public application store. The management service 212 can also provide configuration data for the client application 231 aside from the configuration profiles 230 that are installed on the client device 206. For example, the management service 212 can transmit policies or profiles configure a user's account within the client application 231. Additionally, the management service 212 can transmit configuration profiles 230 to be installed on the client device 206 using management APIs provided by the operating system of the client device 206. The configuration profiles 230 can be restricted such that they are only accessible by the client application 231 and not by other applications using the management APIs.

The third-party services 209 represents one or more servers associated with services that the client device 206 can access over the network 207. For example, a user of the client device 206 might require access to an internet or cloud-based service. The third-party service 209 can provide a network-accessible API that another application or device can use to take actions on data items stored within the third-party service 209. In some examples, the third-party service 209 can require user authentication. In some instances, the third-party service 209 can support federated authentication protocols in which authentication of a user's identity is performed by an identity provider or by an authentication token that can be provided to the client device 206 to provide single sign-on.

Figure 3:
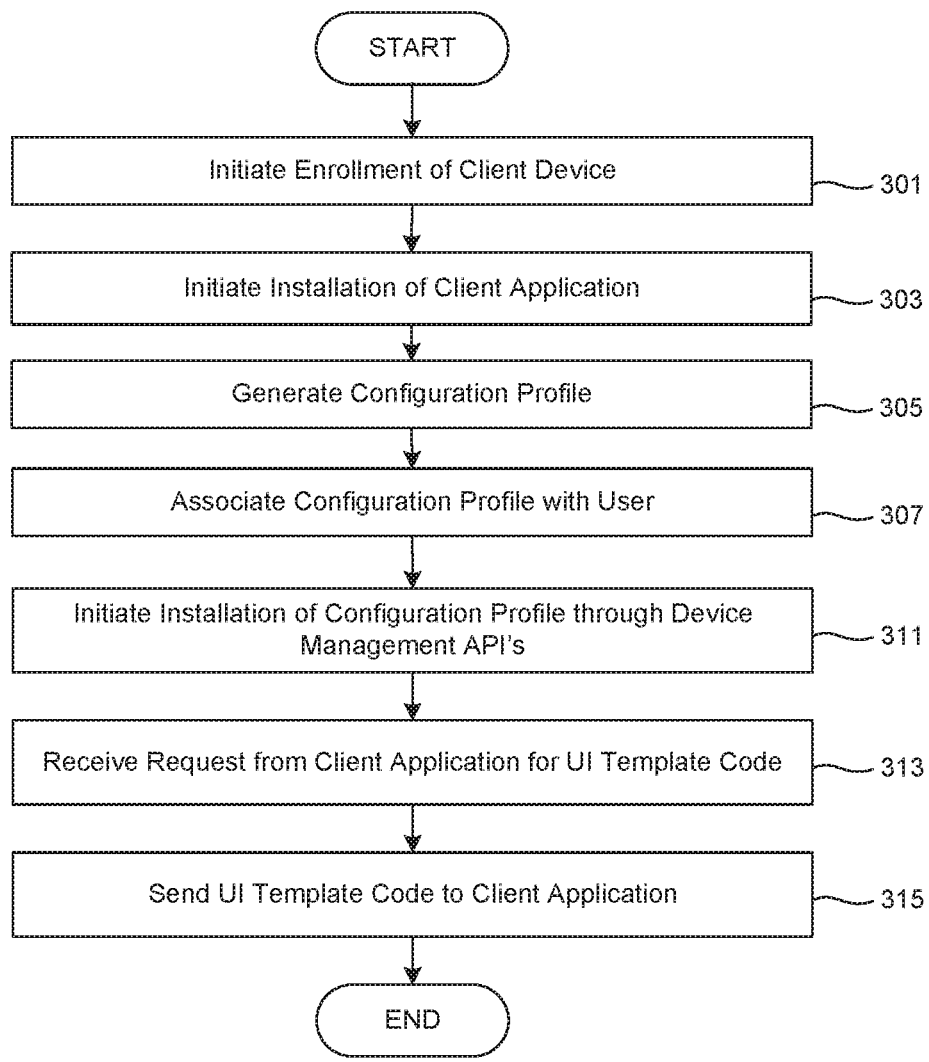
FIGS. 3-5 are flowcharts illustrating functionality according to various examples of the disclosure.

Referring next to FIG. 3, shown is a flowchart that provides one example of how the management service 212 can create and install a configuration profile 230 on a client device 206 so that the client application 231 can access and use the configuration profile 230. Although the use of a management service 212 to manage the client device 206 is described herein, management of the client device 206 is not required to implement the principles of the present disclosure. In other examples, a user can manually install a configuration profile 230 on the client device 206, or the configuration profile 230 can be automatically installed by the operation of a service that is not a management service 212.

At step 301, the management service 212 can initiate enrollment of the client device 206 as a managed device. In some examples, the enrollment process is initiated by the client device 206 when a user enters his or her credentials within the enterprise environment in an enrollment client provided by the operating system of the client device 206.

At step 303, upon completion of enrollment of the client device 206 as a managed device, the management service 212 can initiate installation of the client application 231 as a managed application. It is not a global requirement that the client application 231 be installed as a managed application but only one scenario.

Then, at step 305, the management service 212 can generate a configuration profile 230 associated with a third-party service 209. In one example, the configuration profile 230 can be generated by encoding a configuration file using extensible markup language (XML) according to specifications associated with one or more of a client application 231, a management component 234, or an operating system or platform of the client device 206.

The configuration profile 230 can specify one or more filters including regular expressions that can be used by the client application 231 to identify an entity as a potential element to apply action. As an example, a filter can indicate that all email message subjects beginning with "[BILL]" are subject to a "biller" action. As another example, a filter can indicate that all email messages from email addresses matching a regular expression "*@cdn.site" are subject to another action. The configuration profile 230 can also specify system details (for example, applicable platform such as IOS or ANDROID), authentication types (for example, KERBEROS, single sign-on), template URL end points for requesting user interface template code 232, initial actions to be performed, a list of user interfaces supported by the system (for example, a dialog screen, a button array), a list of expected callbacks from the user interface template code 232 (for example, callbacks to add a contact, callbacks to load a particular screen, callbacks to save contextual values to a data store), and other information.

Next, at step 307, the management service 212 can associate the configuration profile 230 with a particular user account within the enterprise. In one example, associating the configuration profile 230 with a user account can entail obtaining or generating an authentication token or other credential in the third-party service 209 that can be bundled with the configuration profile 230 installed on the user's device.

Further, at step 311, the management service 212 can initiate installation of the configuration profile 230 using the device management APIs provided by the operating system of the client device 206. In some examples, the management component 234 can install the configuration profile on the client device 206 on behalf of the management service 212.

Subsequently, after the client application 231 processes the configuration profile 230, at step 313, the management service 212 receives a request from the client application 231 for user interface template code 232 corresponding to one or more predefined user interface templates. At step 315, the management service 212 sends the user interface template code 232 to the client application 231 using the network 207. Thereafter, the process proceeds to completion.

Figure 4:
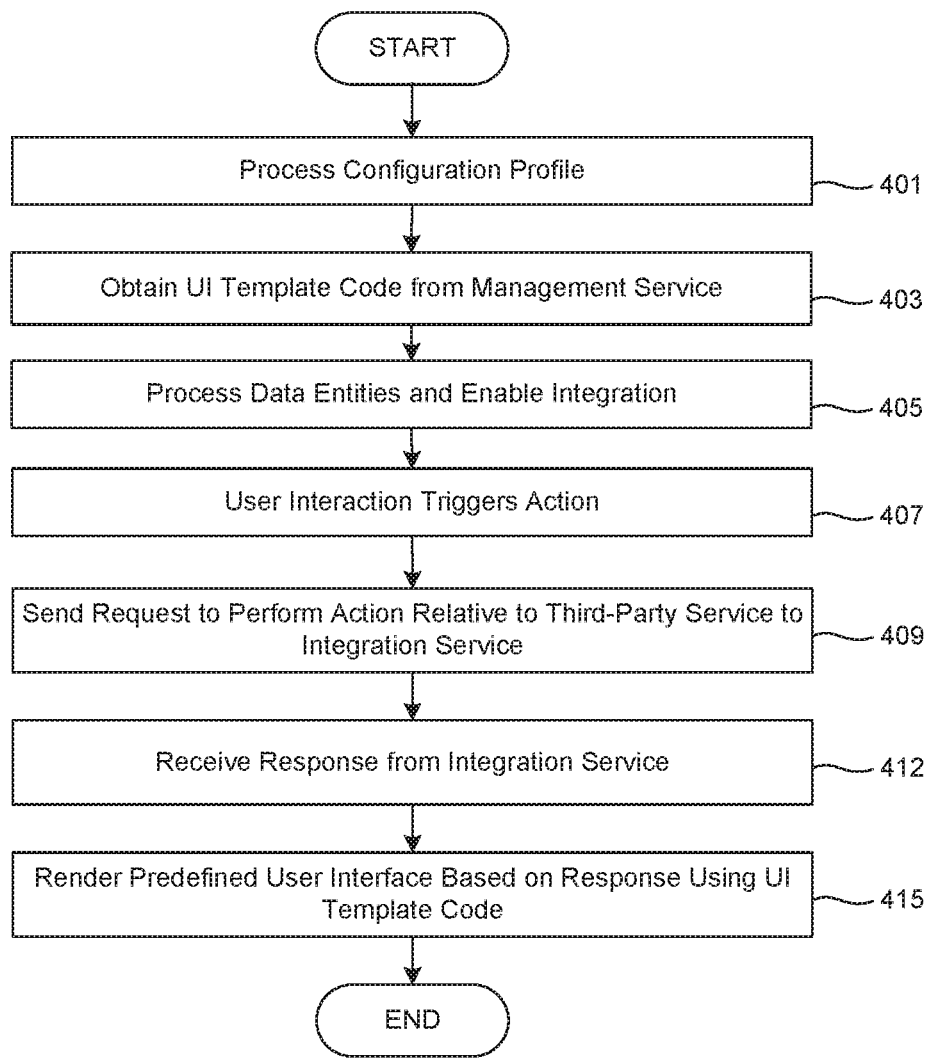

Turning now to FIG. 4, shown is a flowchart that provides one example of how the client application 231 can use the configuration profile 230 to dynamically integrate with a third-party service 209 by way of an integration service 213. To begin with, at step 401, the client application 231 processes the configuration profile 230 that has been configured by a management service 212. For example, the configuration profile 230 can take the form of a configuration file that is sent during the device management enrollment process. In processing the configuration profile 230, the client application 231 can identify user interface template code 232 for rendering predefined user interfaces involving actions performed relative to the third-party service 209.

At step 403, the client application 231 obtains user interface template code 232 as specified in the configuration profile 230 from the management service 212. In addition to code for rendering a plurality of predefined user interfaces, the user interface template code 232 can also include code that implements callbacks to native code executed in the client device 206 (e.g., portions of the client application 231 or libraries used by the client application 231).

At step 405, the client application 231 processes the data entities and enables the integration with the third-party service 209. For example, the configuration profile 230 can include one or more regular expressions that, when applied to the data entities of the client application 231, indicate whether actions can be performed relative to the particular data entities and allow for user triggering of the actions when desired. The data entities of the client application 231 can be specific to the type of application (e.g., email messages, contacts, social network profiles, trouble tickets, etc.).

At step 407, a user interacts with the client application 231 by way of a user interface to trigger an action. In one example, a user selects an "Add Contact" action displayed in a user interface of an email client application 231, where "Add Contact" is intended to add a contact based on the sender of the selected email message to a customer relationship management service (i.e., a third-party service 209).

At step 409, the client application 231 sends a request to perform the action to the integration service 213 through the network 207, where the request to perform the action is relative to the third-party service 209. For example, the request can specify a URL and one or more parameters. In the "Add Contact" scenario, the request can specify a specific email address obtained from the data entity for which the action is performed (i.e., the email message).

At step 412, the client application 231 receives a response to the request from the integration service 213. For example, the response can include an indication of one of a plurality of predefined user interfaces supported by the user interface template code 232. The response can also include a status code and a status message. In the "Add Contact" scenario, the response can either indicate that the email address can be added as a new contact or that the email address cannot be added as a new content (e.g., the email address is already present).

At step 415, the client application 231 renders a predefined user interface based on the response using the user interface template code 232. The native code of the client application 231 processes the indication of the predefined user interface in the response and loads the corresponding template. In one example, a hypertext markup language (HTML) template is loaded, and the user interface template code 232 includes JAVASCRIPT that, when executed, modifies the HTML and displays content that depends on the response. In the scenario of adding a contact, a selected user interface can indicate that adding the contact was successful, or a selected user interface can indicate that the contact already exists. Thereafter, the process proceeds to completion.

Figure 5:
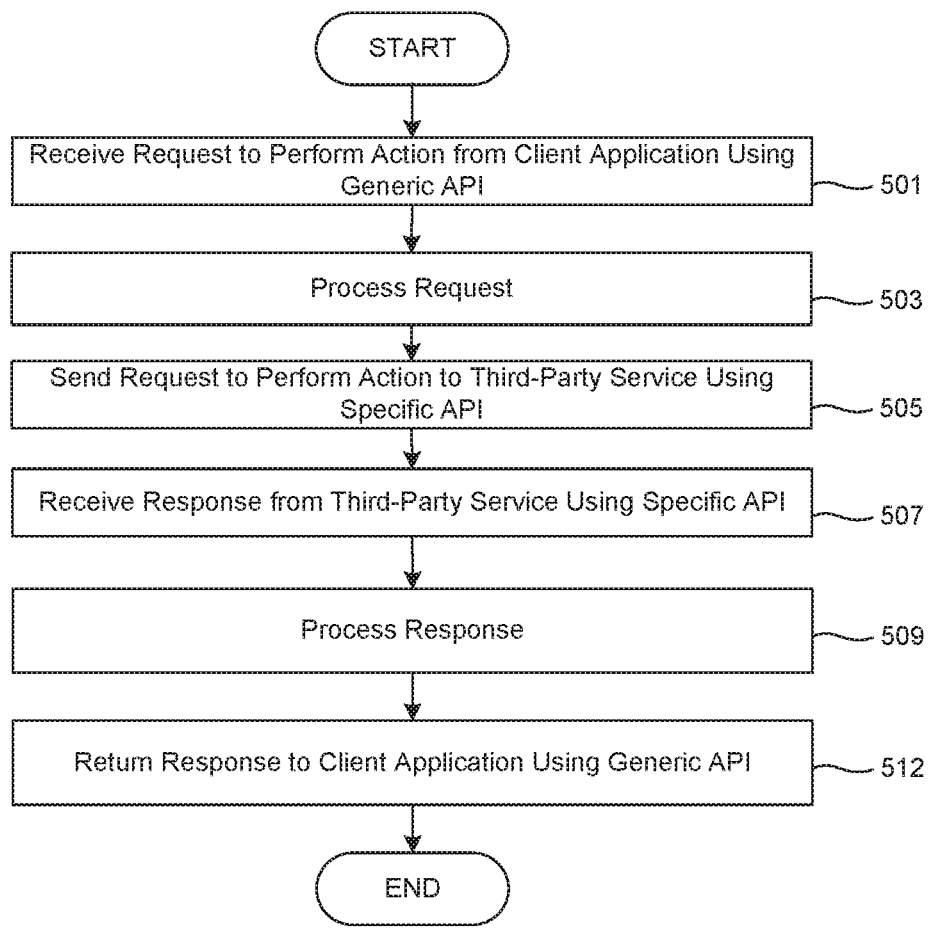

Moving on to FIG. 5, shown is a flowchart that provides one example of how the integration service 213 operates as a proxy for the requests from the client application 231 in order to dynamically integrate the client application 231 with the third-party service 209. To begin with, at step 501, the integration service 213 receives a request to perform an action from a client application 231 using an API that is generic with respect to a plurality of third-party services 209. The integration service 213 can authenticate the client application 231 prior to processing the request. For example, the client application 231 can be authenticated with the integration service 213 based on one or more secure certificates maintained on the client device 206 by the management component 234. The integration service 213 can validate the secure certificates to perform the authentication.

At step 503, the integration service 213 processes the request. In one example, the integration service 213 extracts a URL and one or more parameters from the request. At step 505, the integration service 213 sends a request to perform the action to the third-party service 209 using an API that is specific to the particular third-party service 209. For example, customized code of the integration service 213 (e.g., a plugin for the particular third-party service 209) can generate a service request for the third-party service 209 from the data supplied in the generic request from the client application 231. It is noted that the client application 231 can be independent of the API that is specific to the particular third-party service 209 such that changes to the API do not require any binary code updates to the client application 231.

At step 507, the integration service 213 receives a response from the third-party service 209 using the API that is specific to the particular third-party service 209. The response is based at least in part on a result of the action being performed by the third-party service 209.

At step 509, the integration service 213 processes the response. At step 512, the integration service 213 returns the response to the client application 231 using the API that is generic to the plurality of third-party service 209. Thereafter, the process proceeds to completion.

It is noted that the process of FIG. 5 can be repeated for requests by the client application 231 to perform different actions with the same third-party service 209 or requests by the client application 231 to perform actions with a different third-party service 209. In each case, the requests are received by way of the generic API and sent by the integration service 213 by way of a service-specific API. The integration service 213 can also support multiple different client applications 231 that are configured to utilize the same generic API for dynamic integration.

Figure 6:
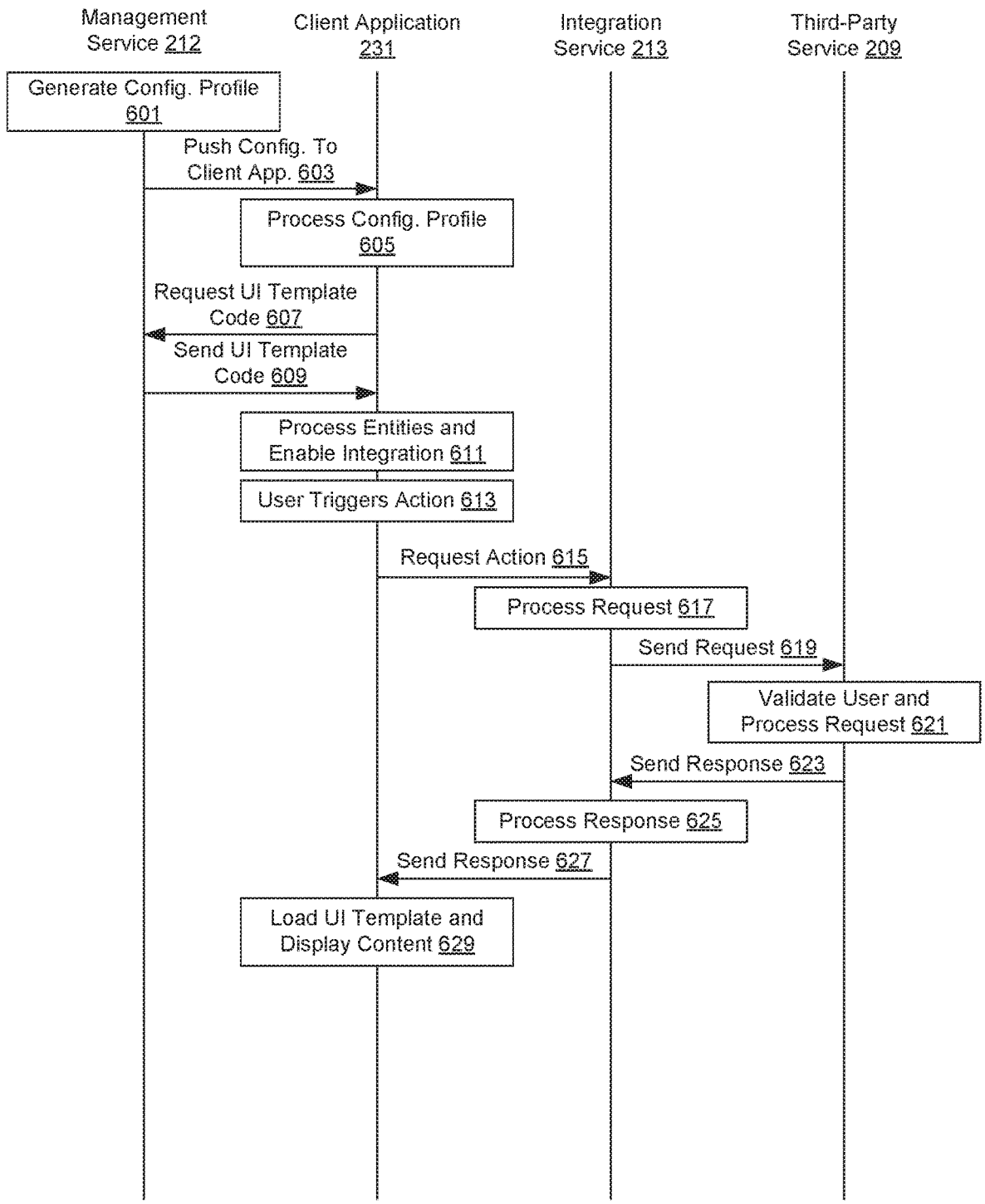
FIG. 6 is a sequence diagram illustrating functionality according to various examples of the disclosure.

Continuing to FIG. 6, shown is a sequence diagram 600 that provides one example of interactions between the management service 212, the client application 231, the integration service 213, and the third-party service 209 to accomplish dynamic integration. Beginning with step 601, the management service 212 generates a configuration profile 230. At step 603, the management service 212 pushes the configuration profile 230 to the client application 231 on the client device 206 using device management channels.

At step 605, the client application 231 processes the configuration profile 230. In response to processing the configuration profile 230, at step 607, the client application 231 sends a request for user interface template code 232 to the management service 212. At step 609, the management service 212 sends the user interface template code 232 to the client application 231 in response to the request.

At step 611, the client application 231 processes various data entities (e.g., social network profiles, contacts, email messages, etc.) and enables dynamic integration with the third-party service 209. Specifically, the client application 231 can render user interfaces that allow for actions to be performed relative to certain data entities. The certain data entities can be determined through application of regular expressions indicated in the configuration profile 230. At step 613, a user triggers an action via a user interface. The client application 231 then generates a request to perform the action, which is sent to the integration service 213 at step 615 through an API that is generic to multiple third-party services 209.

At step 617, the integration service 213 processes the request to perform the action. At step 619, integration service 213 sends the request to the third-party service 209 through an API that is specific to the third-party service 209. At step 621, the third-party service 209 validates or authenticates the user and processes the request. The third-party service 209 returns a response based on the result of the request to the integration service 213 at step 623. The response is returned through the API that is specific to the third-party service 209.

At step 625, the integration service 213 processes the response. For example, the integration service 213 can parse the response according to a format used by the third-party service 209 and extract various parameters. The integration service 213 can apply one or more transformations to one or more of the parameters. The integration service 213 can then generate a new message according to a formation of the generic API and embed the parameters.

At step 627, the integration service 213 sends the response to the client application 231 through the generic API. At step 629, the client application 231 loads a user interface template specified by the response, where the user interface template is loaded from the user interface template code 232. The template can be in HTML, and JAVASCRIPT can be executed based on the response to display content to the user.

The flowcharts of FIGS. 3-5 and the sequence diagram of FIG. 6 show examples of the functionality and operations described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-5 and the sequence diagram of FIG. 6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 206, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 212, integration service 213, client application 231, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash drives. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for dynamically integrating client applications with third-party services, comprising:
   at least one computing device comprising a processor and a memory; and
   an integration service executable by the at least one computing device, the integration service causing the at least one computing device to at least:
      initiate enrollment of a client device as a managed device;
      push configuration profiles to the client device, the configuration profiles specifying actions that can be performed by a plurality of third-party services;
      send user interface template code to the client device, the user interface template code comprising a plurality of predefined user interface templates associated with the actions that can be performed by the plurality of third-party services;
      receive, from the client device, a first request for a particular third-party service to perform an action associated with a user interface template among the plurality of predefined user interface templates, the first request being received through a first application programming interface (API) generic to the plurality of third-party services;
      send a second request to the particular third-party service to perform the action associated with the user interface template using a second API specific to the particular third-party service;
      receive a first response from the particular third-party service using the second API, the first response being based at least in part on a result of the action associated with the user interface template by the particular third-party service; and
      send a second response to the client device through the first API, the second response comprising an identifier of the user interface template among the plurality of predefined user interface templates for rendering the result of the action and a status code for a content display update to the user interface template, the status code being based at least in part on the result of the action associated with the user interface template by the particular third-party service.

2. The system of claim 1, wherein a user interaction with the user interface template rendered by the client device causes the first request to perform the action to be sent to the integration service.

3. The system of claim 1, wherein:
   the first request for the particular third-party service to perform the action comprises a uniform resource locator (URL) and at least one parameter from the client device; and
   the first response from the particular third-party service.

4. The system of claim 1, wherein the second response further comprises a status message.

5. The system of claim 1, wherein the first request to perform the action is generated by a client application executed on the client device, the client application being managed by a management service.

6. The system of claim 5, wherein the client application is an email client application, the one of the plurality of predefined user interfaces comprises a user interface of the email client application, and the action is relative to an email message of the email client application.

7. The system of claim 1, wherein the integration service further causes the at least one computing device to at least:
   receive, from the client device, a subsequent request to perform another action associated with another user interface among the plurality of predefined user interfaces executing on the client device, the subsequent request being received through the first API;
   communicate with another third-party service to perform the other action using a third API specific to the other third-party service; and
   send a subsequent response to the client device through the first API, the subsequent response indicating another user interface template for rendering the other user interface based at least in part on a result of the other action by the other third-party service.

8. A method for dynamically integrating client applications with third-party services, comprising:
   initiating enrollment of a client device as a managed device;
   pushing configuration profiles to the client device, the configuration profiles specifying actions that can be performed by a plurality of third-party services;
   sending user interface template code to the client device, the user interface template code comprising a plurality of predefined user interface templates associated with the actions that can be performed by a plurality of third-party services;
   receiving, from the client device, a first request for a particular third-party service to perform an action associated with a user interface template among the plurality of predefined user interface templates, the first request being received through a first application programming interface (API) generic to the plurality of third-party services;
   sending a second request to the particular third-party service to perform the action using a second API specific to the particular third-party service;
   receiving a first response from the particular third-party service using the second API, the first response being based at least in part on a result of the action by the particular third-party service; and
   sending a second response to the client device through the first API, the second response comprising an identifier of the user interface template among the plurality of predefined user interface templates for rendering the result of the action and a status code for a content display update to the user interface template, the status code being based at least in part on the result of the action by the particular third-party service.

9. The method of claim 8, further comprising configuring the client device, based at least in part on the second response, to load and render the user interface template.

10. The method of claim 8, wherein the user interface template code comprises code that implements at least one callback to native code executed in the client device.

11. The method of claim 8, further comprising sending the user interface template code to the client device in response to the client device requesting the user interface template code as a result of processing the configuration profiles.

12. The method of claim 11, further comprising sending the configuration profiles to the client device as part of a device management enrollment process for the client device.

13. The method of claim 8, further comprising sending data encoding at least one regular expression to the client device before receiving the request to perform the action, wherein the at least one regular expression identifies at least one entity to which the action can be applied.

14. A non-transitory computer-readable medium comprising machine-readable instructions, wherein when executed by a processor of a computing device, the machine-readable instructions cause the computing device to at least:
   initiate enrollment of a client device as a managed device;
   push configuration profiles to the client device, the configuration profiles specifying actions that can be performed by a plurality of third-party services;
   send user interface template code to the client device, the user interface template code comprising a plurality of predefined user interface templates associated with the actions that can be performed by a plurality of third-party services;
   receive, from the client device, a first request for a particular third-party service to perform an action associated with a user interface template among the plurality of predefined user interface templates, the first request being received through a first application programming interface (API) generic to the plurality of third-party services;
   send a second request to the particular third-party service to perform the action associated with the user interface template using a second API specific to the particular third-party service;
   receive a first response from the particular third-party service using the second API, the first response being based at least in part on a result of the action associated with the user interface template by the particular third-party service; and
   send a second response to the client device through the first API, the second response comprising an identifier of the user interface template among the plurality of predefined user interface templates for rendering the result of the action and a status code for a content display update to the user interface template, the status code being based at least in part on the result of the action associated with the user interface template by the particular third-party service.

15. The non-transitory computer-readable medium of claim 14, wherein the machine-readable instructions further cause the computing device to at least send data encoding at least one regular expression to the client device before receiving the request to perform the action, wherein the at least one regular expression identifies at least one entity to which the action can be applied.

16. The non-transitory computer-readable medium of claim 14, wherein the request to perform the action comprises a uniform resource locator (URL) and at least one parameter, and wherein the first response further comprises a status message.

17. The non-transitory computer-readable medium of claim 14, wherein a client application that generates the first request is independent of the second API.

* * * * *